United States Patent
Rose et al.

(10) Patent No.: US 7,188,447 B2
(45) Date of Patent: Mar. 13, 2007

(54) MACHINE FOR LAYING GROUND COVER ON SEEDED AREAS

(75) Inventors: Mark D. Rose, Charlestown, IN (US); Jack R. Sherron, Salem, IN (US)

(73) Assignee: Sherron & Rose, LLC, Charlestown, IN (US)

( * ) Notice: Subject to any disclaimer, the term of this patent is extended or adjusted under 35 U.S.C. 154(b) by 33 days.

(21) Appl. No.: 10/841,038

(22) Filed: May 7, 2004

(65) Prior Publication Data
US 2005/0198895 A1    Sep. 15, 2005

Related U.S. Application Data

(60) Provisional application No. 60/553,105, filed on Mar. 15, 2004.

(51) Int. Cl.
*A01G 13/02*    (2006.01)
(52) U.S. Cl. ..................................................... 47/32.2
(58) Field of Classification Search ............. 47/1.01 R, 47/1.7, 29.1, 32.3; 111/199, 200; 405/302.4, 405/302.5, 302.6, 302.7, 15
See application file for complete search history.

(56) References Cited

U.S. PATENT DOCUMENTS

| | | | | |
|---|---|---|---|---|
| 1,276,887 A | * | 8/1918 | Eckart | 47/9 |
| 3,180,290 A | * | 4/1965 | Kappelmann et al. | 111/141 |
| 3,293,797 A | * | 12/1966 | Kappelmann et al. | 47/9 |
| 3,473,755 A | | 10/1969 | Brown | 242/391 |
| 3,559,599 A | * | 2/1971 | Hoadley | 111/200 |
| 3,890,910 A | * | 6/1975 | Angruner | 111/200 |
| 4,084,763 A | | 4/1978 | Zamboni | 242/393 |
| 4,377,919 A | * | 3/1983 | Gams | 81/44 |
| 4,513,530 A | * | 4/1985 | Nyboer | 47/9 |
| 4,706,864 A | * | 11/1987 | Jacobsen et al. | 227/109 |
| 4,754,815 A | | 7/1988 | Brouwer et al. | 414/789.7 |
| 4,777,890 A | | 10/1988 | Raymond | 111/100 |
| 4,890,801 A | | 1/1990 | Brouwer et al. | 83/861 |
| 5,215,278 A | | 6/1993 | Hess | 242/557 |
| 5,226,376 A | * | 7/1993 | Shaw | 111/144 |
| 5,304,014 A | | 4/1994 | Slutz | 405/129.9 |

(Continued)

FOREIGN PATENT DOCUMENTS

FR    2620592 A1 *    3/1989

*Primary Examiner*—Francis T. Palo
(74) *Attorney, Agent, or Firm*—Carrithers Law Office PLLC; David W. Carrithers

(57) ABSTRACT

A machine that quickly lays a cover over a freshly seeded area and at the same time anchors the cover to the ground. The cover helps prevent moisture from escaping from the ground and holds the seeds in place during watering the area, during heavy rains and/or during wind storms. The ground cover is a blanket in the form of a ribbon of considerable length that is rolled onto a spindle and may consist of straw or the like or the equivalent thereof retained between a pair of porous sheet, mesh or netting members or suitably attached or adhering to single sheet of the same and which preferably is biodegradable. The ribbon is payed out from the spindle as the machine traverses the area to be covered. Apparatus on the machine anchors the laid in place ribbon to the ground as it is placed on the ground by driving pins through the ribbon into the ground and/or by forming and pressing a "V" shape formation in the ribbon an adjustably variable selected depth into the ground.

8 Claims, 8 Drawing Sheets

U.S. PATENT DOCUMENTS

| | | | |
|---|---|---|---|
| 5,536,116 A | 7/1996 | Lammers et al. | 405/129.9 |
| 5,620,281 A | 4/1997 | Lammers et al. | 405/129.9 |
| 5,697,760 A | 12/1997 | Rosen | 172/253 |
| 6,131,668 A | 10/2000 | Houska | 111/100 |
| 6,299,094 B1 | 10/2001 | James, Jr. | 242/390 |
| 6,550,406 B2 | 4/2003 | Bass et al. | 405/302.6 |
| 6,551,031 B2 * | 4/2003 | Van Ornum | 405/302.7 |
| 6,575,393 B1 | 6/2003 | James, Jr. | 242/390 |
| 6,663,324 B2 * | 12/2003 | Nordloh | 405/302.6 |
| 2003/0072622 A1 * | 4/2003 | McPhillips | 405/302.7 |

* cited by examiner

MACHINE FOR LAYING GROUND COVER ON SEEDED AREAS

This application claims priority from U.S. Provisional Application Ser. No. 60/553,105 filed on Mar. 15, 2004 which is incorporated in its entirety herein.

FIELD OF INVENTION

The present invention relates generally to seeding large areas of lawns, sod farms and the like and more particularly to an apparatus for laying a ground cover over freshly seeded areas that generally are of substantial size often consisting of several areas.

BACKGROUND OF INVENTION

Freshly seeded areas are often covered with a thin layer of straw to prevent moisture from escaping from the soil, prevent birds from feeding on exposed seeds and/or prevent the seeds from being washed away by rain and heavy down pours. Loosely spread straw however can readily be blown away by a wind thereby exposing the seeds over various areas resulting in non-uniform coverage.

SUMMARY OF INVENTION

A principal object of the present invention is to provide a machine for laying a ribbon, sheet, or strip of ground cover as it is payed out from a roll of the ground cover carried by the machine.

A further object is to provide a machine for the forgoing purpose and which carries on the machine a supply of the rolls of the ground cover for dispensing from in sequence one after the other.

A further object of the present invention is to provide a machine for laying a ribbon of ground cover and at the same time anchor the ribbon to the ground.

Another object of the present invention is to provide a device for positioning a strip or sheet of pliable material comprising biodegradable organic matter such as straw or compost, which may be compressed or woven in a roll forming a sheet or held in position with other material providing structural support such as canvas, netting, or other web type material which may be used alone or in combination with straw to hold the biodegradable material in place and facilitate application of the material from a roll.

A still further object of the present invention is to provide a machine for laying a ribbon of ground cover on the ground and at the same time anchoring the marginal edges of the ribbon to the ground and thereby eliminating the need to overlap adjacently disposed edges of side-by-side laid ribbons.

In keeping with the foregoing there is provided in accordance with the present invention a machine for laying a ribbon, strip, or sheet of ground cover over selected ground areas comprising a rigid frame structure with means supporting the same in selected vertical spaced relation above the ground; spindle support means on the frame for holding at least one spindle from which a ribbon of suitable ground cover can be dispensed as the machine moves forward over the selected area; and means on the machine for anchoring the deposited ribbon to the ground while being payed out from the spindle as the machine traverses the area.

Applicant's machine quickly lays a cover over a freshly seeded area and at the same time anchors the cover to the ground. The cover helps prevent moisture from escaping from the ground and holds the seeds and/or soil in place during irrigation of the area, during heavy rains and or during wind storms. The ground cover comprises a blanket or sheet in the form of a ribbon of material of selected length (e.g. 500 to 1000 feet) that is rolled onto a spindle and may consist of straw or the like or the equivalent thereof retained between a pair of porous or mesh members or suitably attached or adhering to single porous sheet or mesh or netting of material which preferably is biodegradable. The ribbon is payed out from the spindle as the machine traverses the area to be covered. The machine as disclosed herein is drawn by a tractor over the area to be covered but obviously can be constructed as a self contained self propelled machine.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF PREFERRED EMBODIMENT

Figure 1:
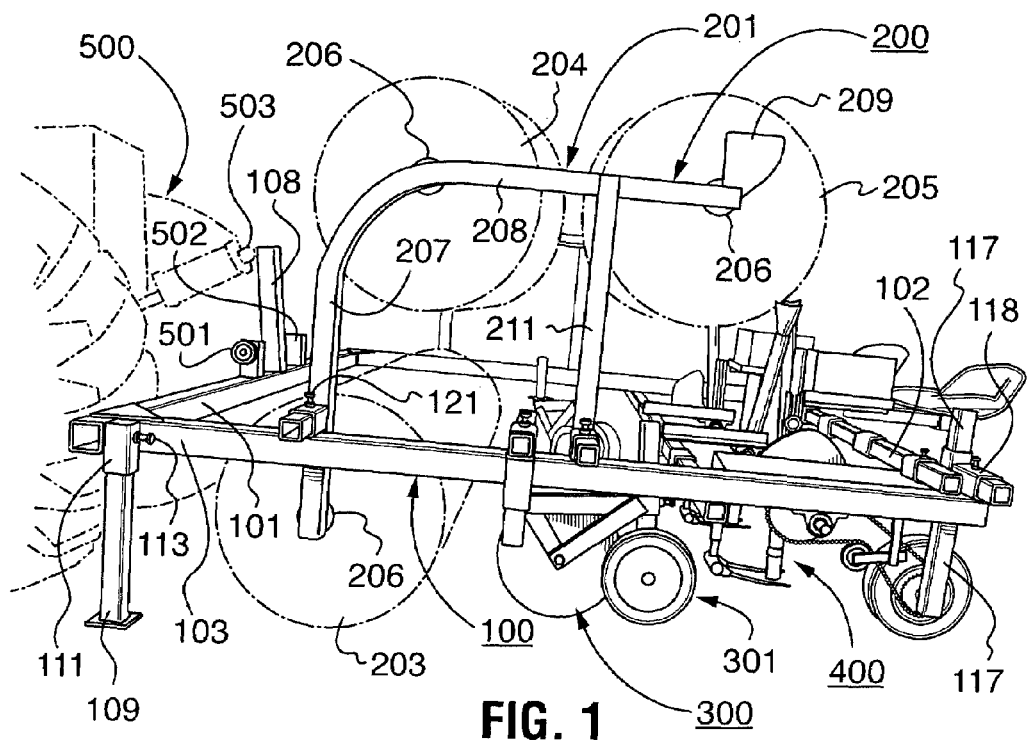
FIG. 1 is a perspective view of the left side of a machine provided in accordance with the present invention.
Figure 2:
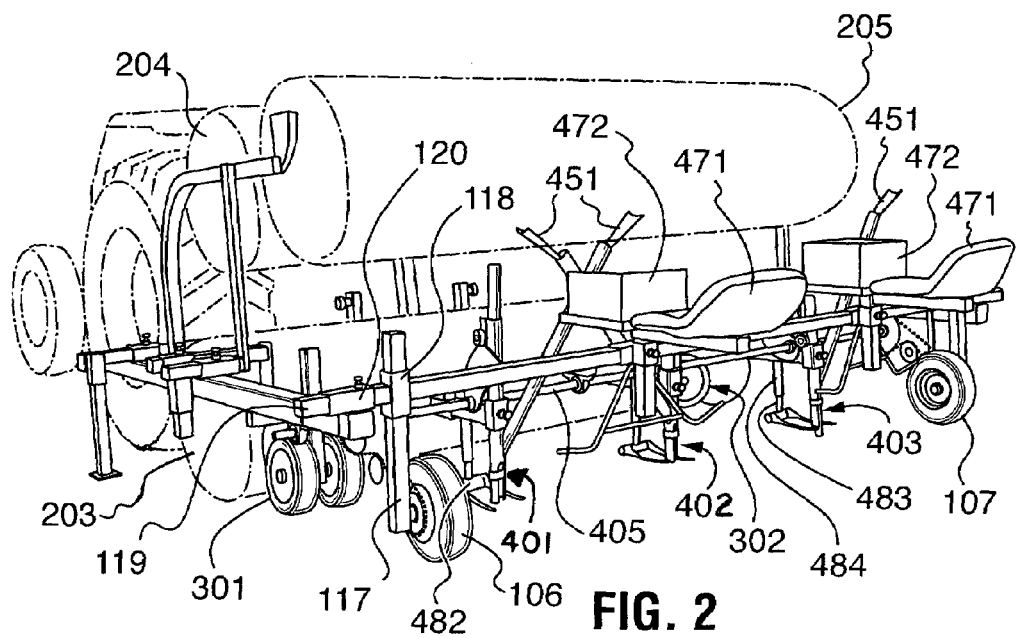
FIG. 2 is similar to FIG. 1 but taken further to the rear of the machine.
Figure 3:
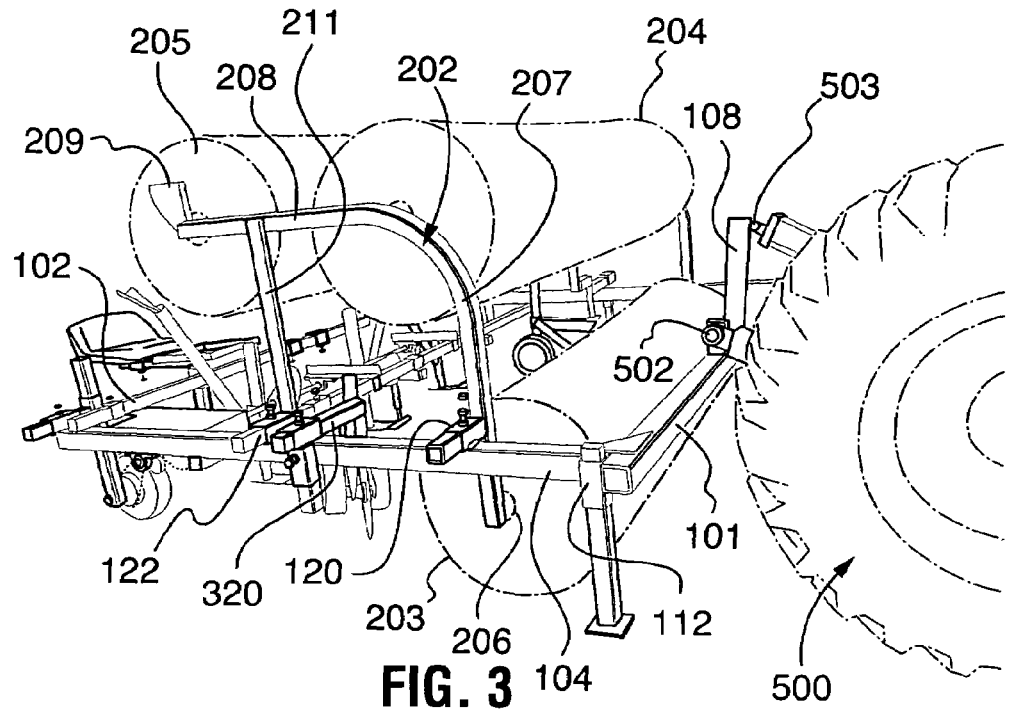
FIG. 3 is a perspective view of the machine taken from the right side.
Figure 4:
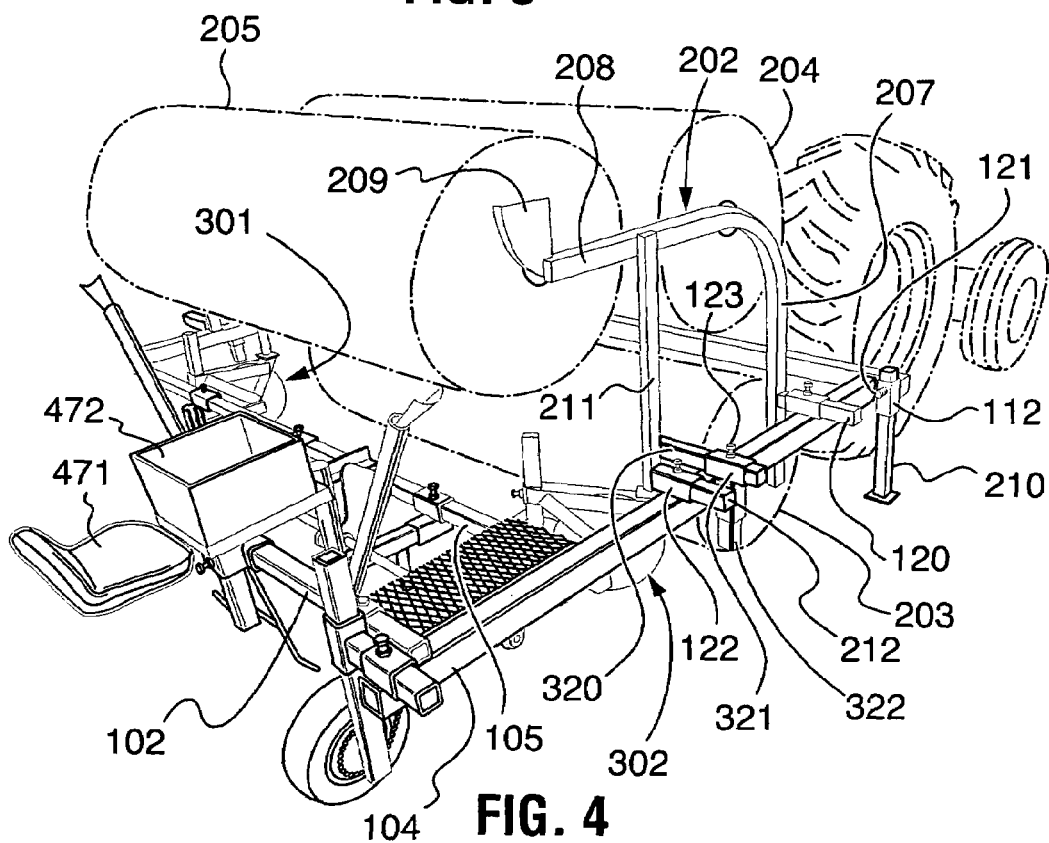
FIG. 4 is similar to FIG. 3 but taken further from the rear of the machine.

With reference to the drawings, applicants machine consists basically of a rigid frame 100, a magazine rack 200 mounted on the frame and from which a ribbon, strips, or a sheet of material of ground cover is payed out and laid on the ground as the machine traverses the area to be covered together with means for anchoring the ribbon, strips, or sheet of material to the ground which typically consists of at least a first and second ribbon ground anchoring means designated respectively 300 and 400.

The frame 100 is a horizontally disposed rigid rectangular structure made up of metal tubular members and includes respective front and rear cross members 101, 102, laterally spaced apart respective side members 103, 104 and an intermediate cross member 105. The frame 100 can be pulled and supported on wheels, mounted to a three point hitch arrangement, or a combination of same. The frame 100 in one preferred embodiment is independently supported by means comprising at the rear on a pair of pneumatically tired wheels 106, 107 and the front is carried by a three point hitch of a tractor 500. Obviously the front can be carried by one or more wheels connected by a tongue or the like which in turn can be coupled to the draw bar of the tractor. Alternatively the machine can be constructed as a self contained self propelled unit with powered and steerable wheels or as a track laying vehicle ( e.g. rubber tracks).

In the embodiment illustrated the three point hitch of the tractor 500 is pivotally connected to the front cross member 101 as at 501, 502, located respectively on opposite sides of a post 108 that is secured to and projects upwardly from the cross member 101, and at 503 to the vertical post 108.

Figure 15:
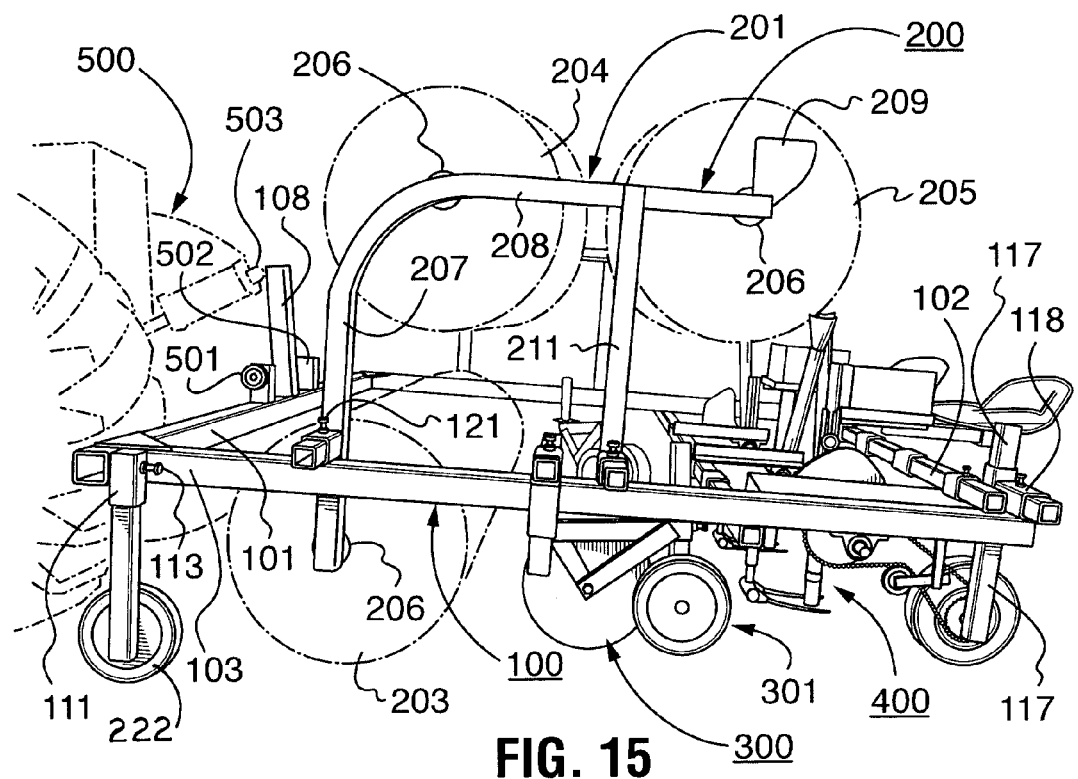
FIG. 15 is the same view as FIG. 1 but including a swivel caster or wheel in place of the jack stand on each side of the machine.

The front corners of the frame have vertically disposed posts 109, 110 projecting downwardly providing supports when the machine is not in use. The posts are slidably mounted in respective one of a pair of sleeves 111, 112 secured to the frame. The posts can thereby slide upwardly and downwardly permitting suitable height positioning and lock means is provided by a set screw 113 threaded through a wall of the sleeve to engage the leg. Obviously the legs may consist of screw jacks, hydraulic or pneumatic jacks or the like or the equivalent of the foregoing. As shown in FIG. 15, the front posts 109,110 are replaced by casters or wheels 222 which may be fixed or pivotal and solid or pneumatic.

The preferred embodiment shown in FIGS. 1 and 15 include a pair of pneumatic tired wheels 106, 107 which are journal led on respective ones of a pair of vertical posts 117. Each post 117 is slidably disposed in a sleeve 118 that has a horizontally disposed member 119 secured thereto and projecting therefrom. The member 119 is slidably disposed in a sleeve 120 that is rigidly secured to the frame 100. The sleeves have set screws projecting through a wall thereof, (and lock nuts if desired), permitting the wheels to be adjustably positioned vertically and laterally relative to the rigid frame 100.

The magazine rack 200 can hold one or more rolls of a ribbon of suitable ground cover and comprises a laterally spaced apart pair of rails 201, 202 mounted on the frame and projecting upwardly therefrom. The magazine is illustrated as having three rolls designated 203, 204, 205 of ground cover with each consisting of a ribbon of suitable structure wound onto respective ones of three spindles 206. Opposite ends of the spindles are journal led on the rails so that the ribbons (one at a time) can be payed out onto the ground as the machine moves forward. Just prior to completion of paying out one roll the trailing end of the ribbon thereof is connected in a suitable manner to the lead end of the ribbon of the next roll to be payed out.

The rails 201, 202 maybe channel shaped in cross-section and are adjustably mounted on the frame 100 for movement in a direction toward and away from one another to accommodate various widths of rolls. The rails illustrated have a vertical component 207 that merges into a horizontal component 208 the trailing end of which has an upwardly directed widened mouth portion 209 for receiving an end of the spindles to load the magazine. The ribbon is first dispensed from roll 203 located at the lower end of the vertical portion and during dispensing the roll maybe in rolling engagement with the ground in which case it maybe desirable to have the journal for the spindle thereof floating in the channel so that the roll will remain in contact with the ground as it gets smaller from being payed out. This can help to compact and level a freshly seeded area. The ribbon is next dispensed from roll 204 and as it does it passes under the spindle of roll 203 (or a separate roller not shown mounted on the rigid frame and located closely adjacent the ground) before being crimped at the edges into the ground by a spaced apart pair of crimping discs of units 301, 302. Next the ribbon is dispensed from roll 205 passing around the spindle for roll 204 and the under the spindle for roll 203.

The vertical component 207 of the rail has a horizontal member 210 secured thereto and projecting therefrom through a sleeve 120 that is secured to the frame side rail associated therewith (103, 104 as the case maybe). A set screw 121 though a wall of the sleeve (and lock nut thereon if desired) provides means for locking the rails in a desired spacing relative to one another. The horizontal component 208 of the rail has a support post 211 secured thereto and projecting downwardly therefrom. The post 211 has a horizontally disposed member 212 secured thereto and projecting therefrom through a sleeve 122 on the frame side rail. A set screw 123 (and lock nut thereon if desired) allows one to adjustably position the rails. Moving the posts 210 and 212 in their respective sleeves not only permits one to position the track rails with a desired spacing there between but also permits aligning the track rails with respect to one another.

Figure 5:
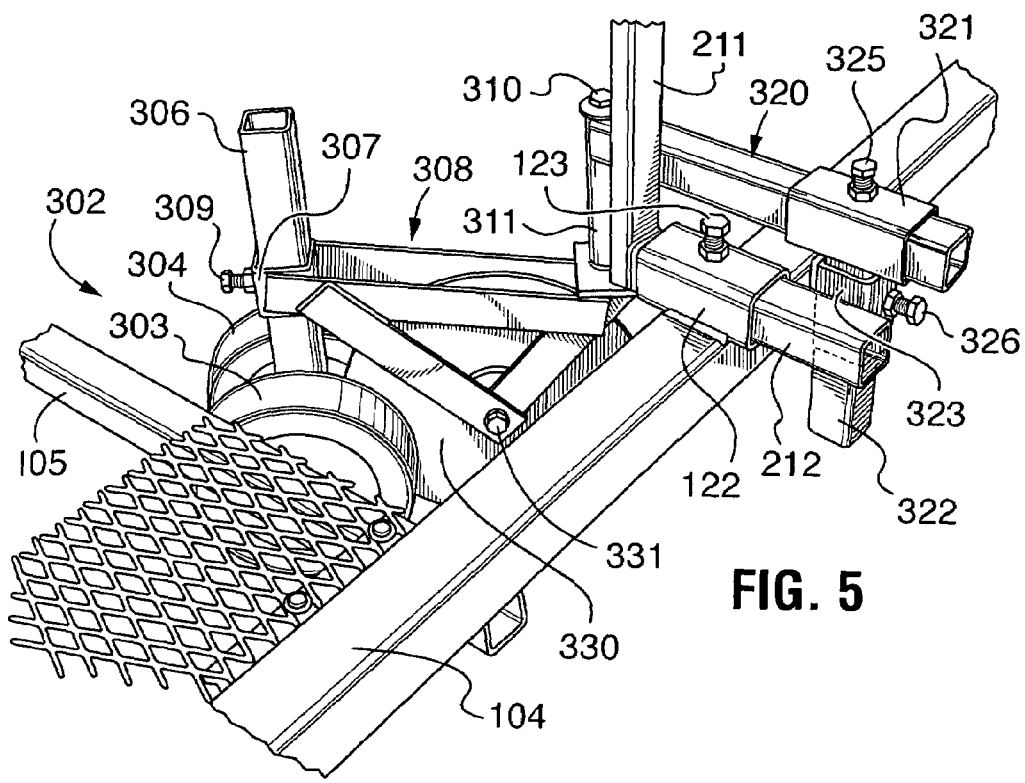
FIG. 5 is a top perspective view of a rear portion of the machine illustrating one of a pair of units that anchors the marginal edges of the ribbon to the ground.
Figure 6:
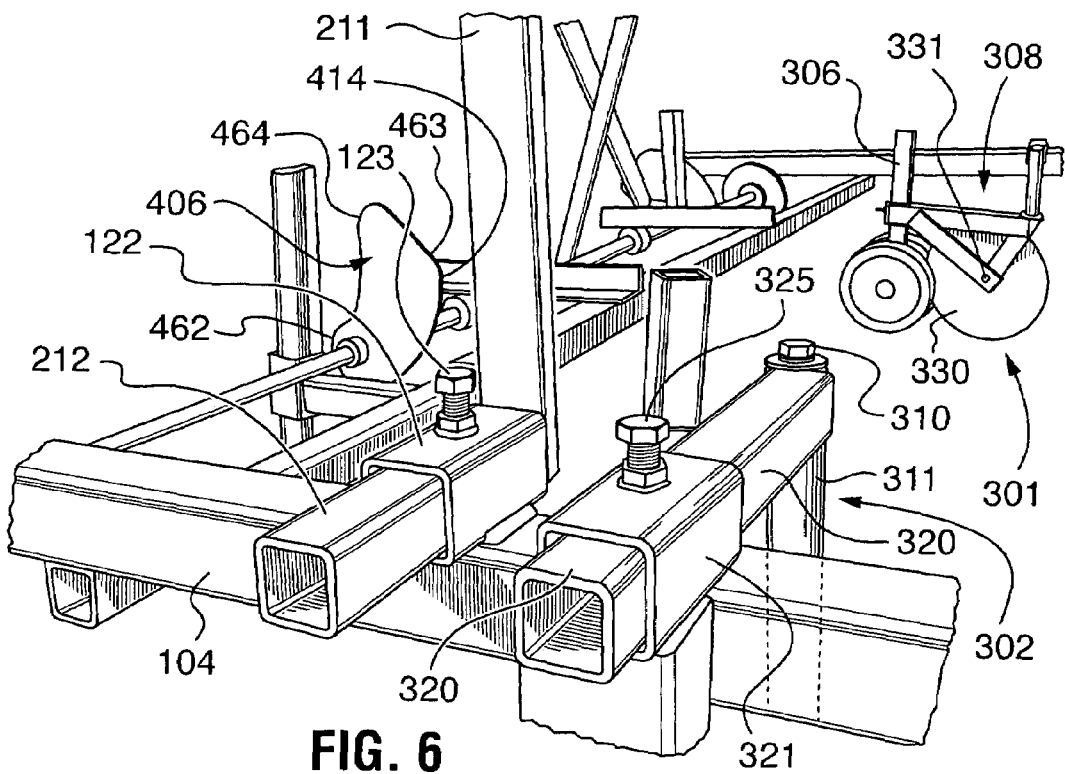
FIG. 6 is a perspective view a portion of the machine taken from the same side as FIG. 3 illustrating further detail.
Figure 7:
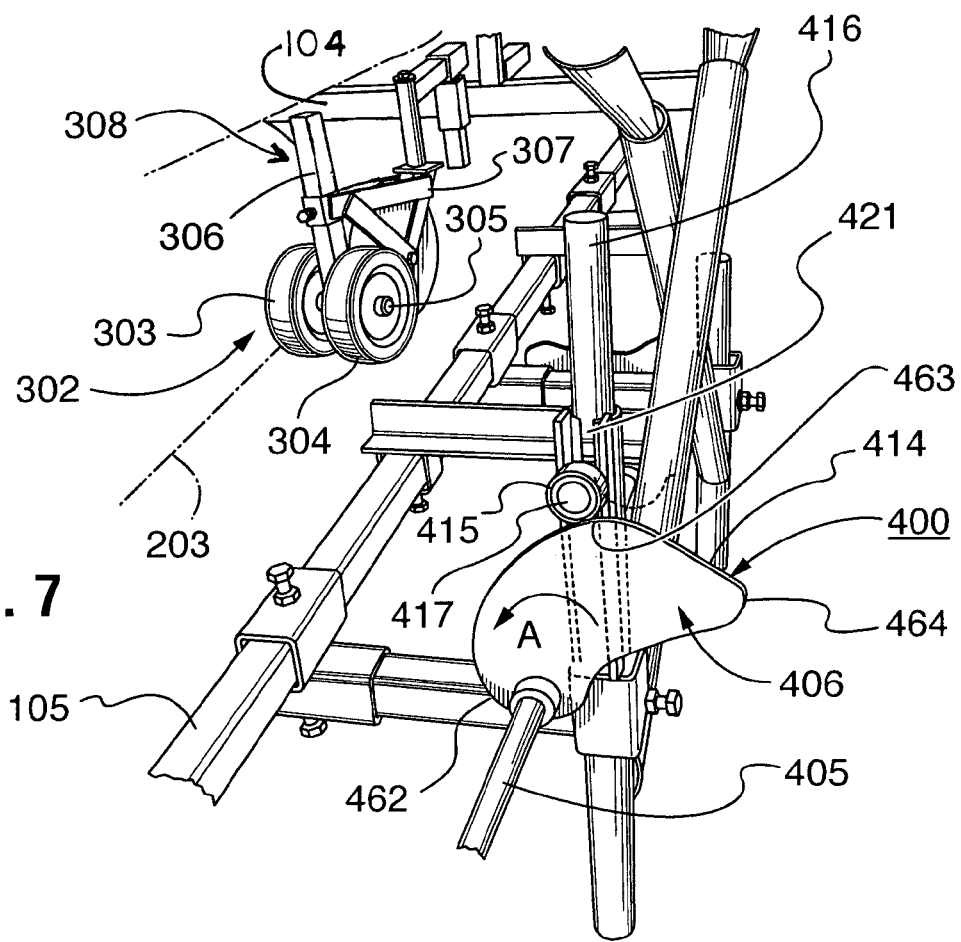
FIG. 7 is similar to FIG. 6 but illustrating further detail of the same general area of the machine.
Figure 8:
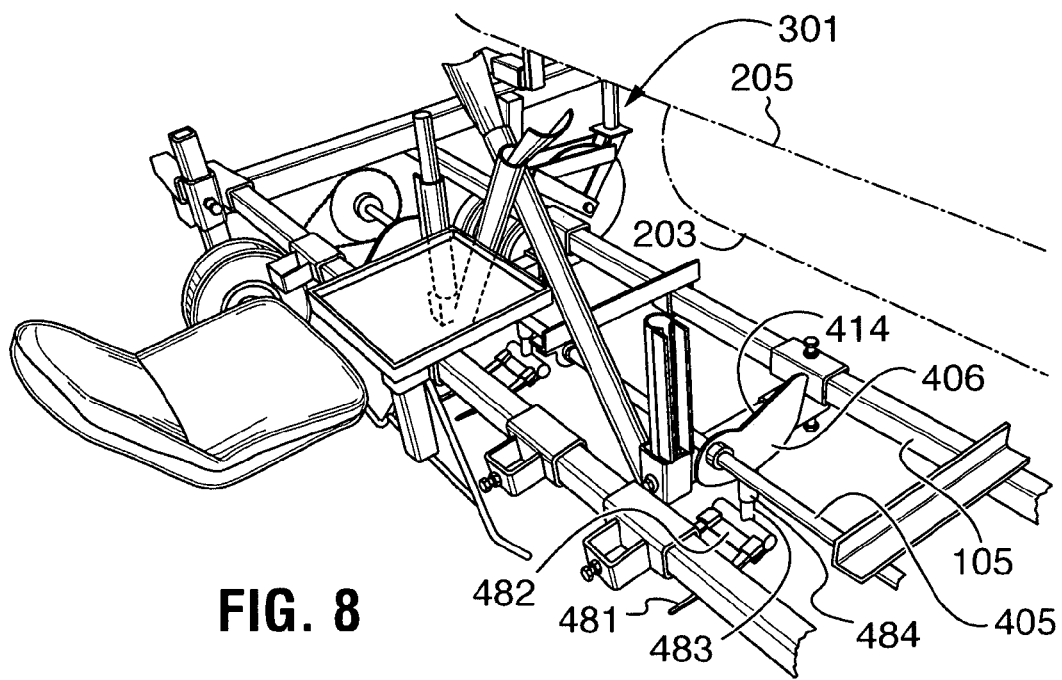
FIG. 8 is a top perspective of the rear portion of the machine.
Figure 9:
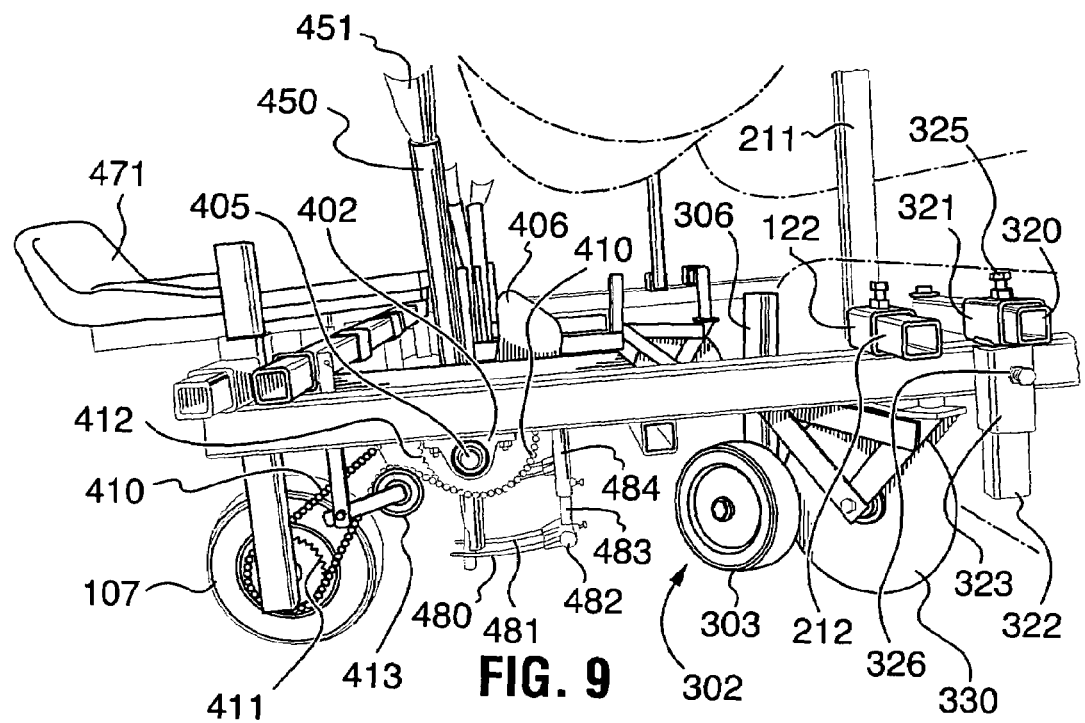
FIG. 9 is a side view of the machine taken from the same side as FIG. 3.
Figure 10:
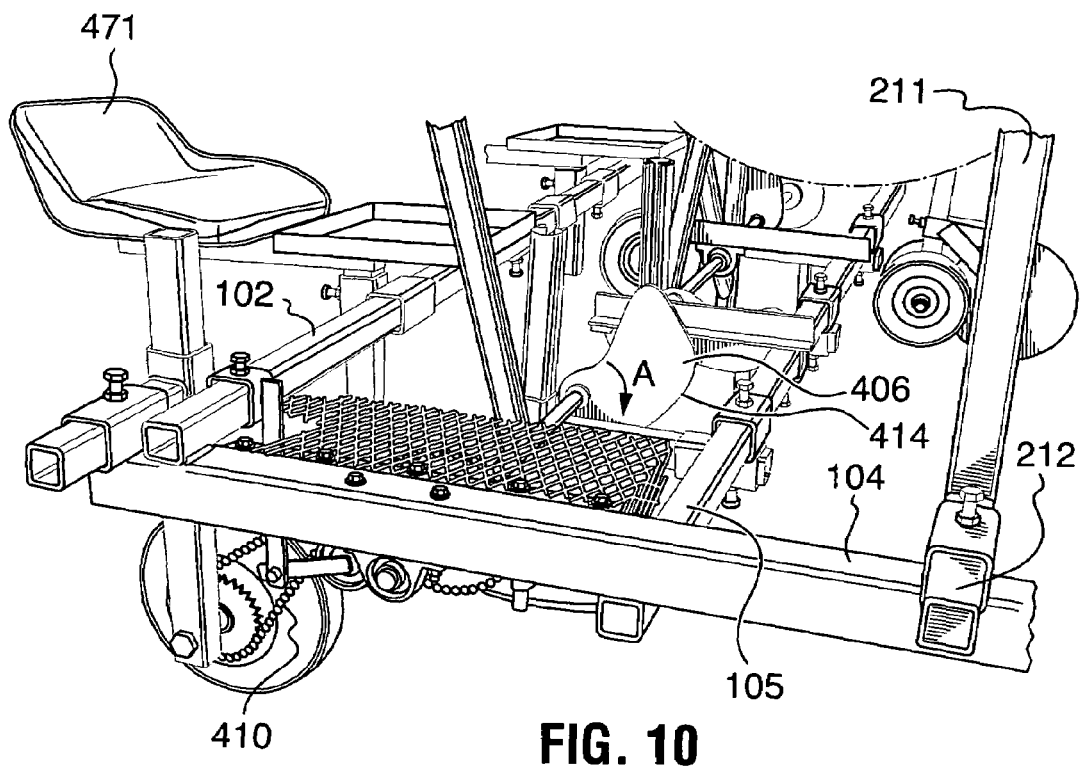
FIG. 10 is perspective view of a rear right hand side portion of the machine.
Figure 11:
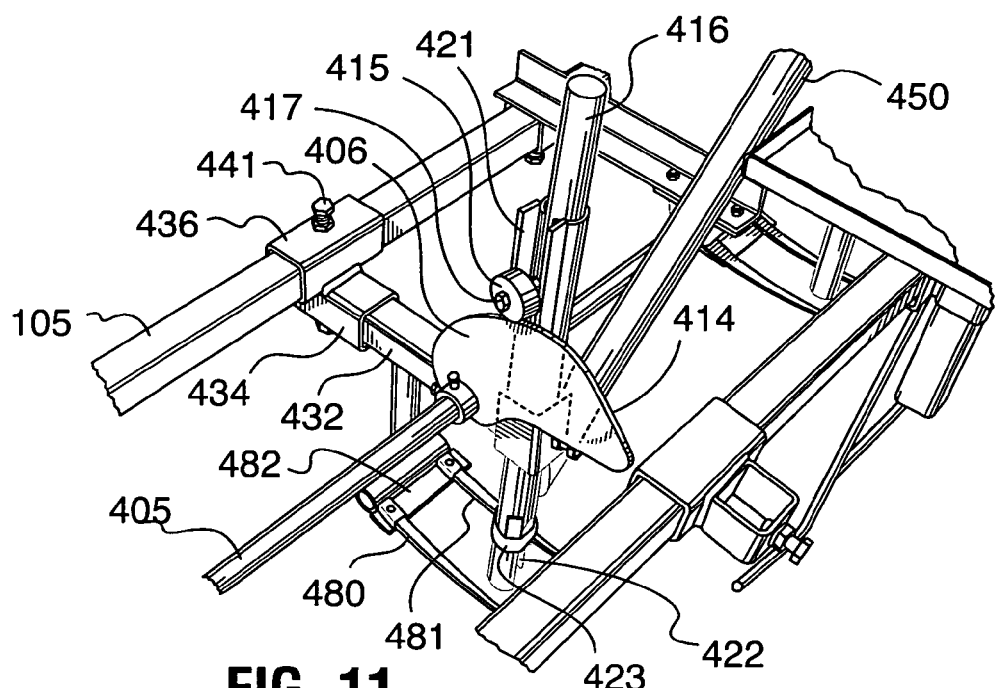
FIG. 11 is a top perspective view of a rear portion of the machine illustrating details of apparatus for anchoring the ribbon of material to the ground.
Figure 12:
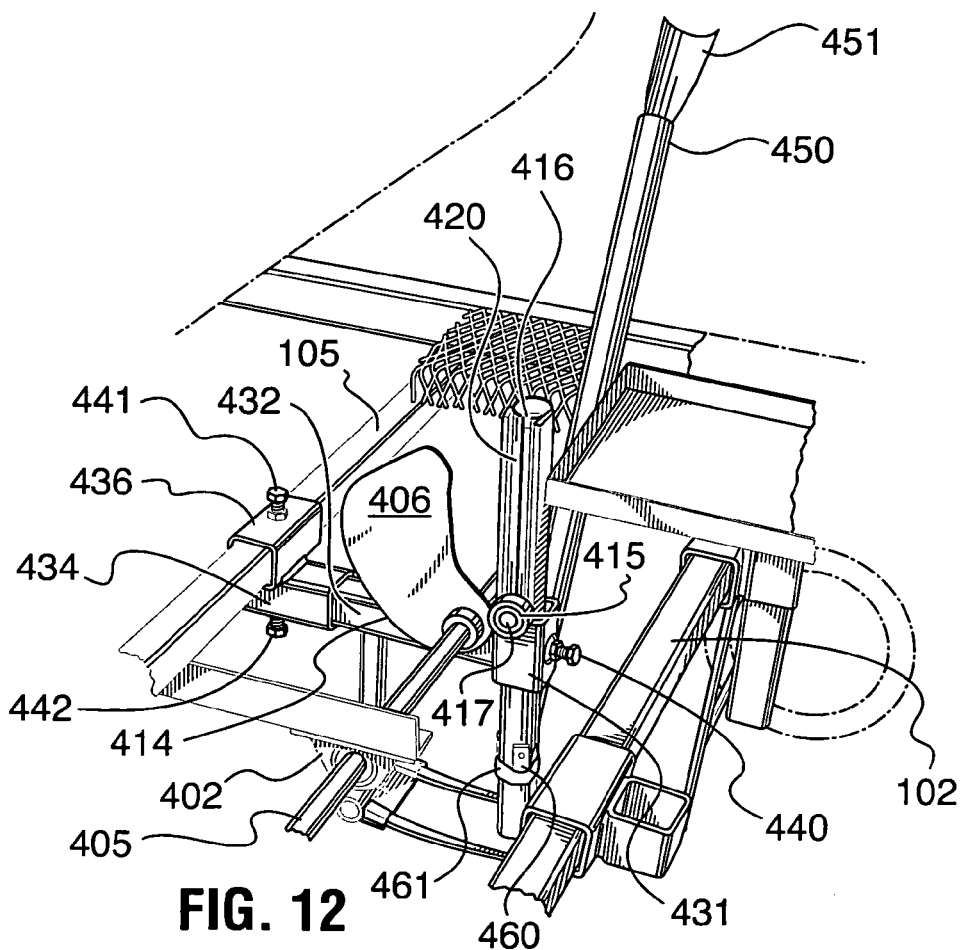
FIG. 12 is similar to FIG. 1 1 but showing further detail taken from a different angle.

The ribbon first anchoring means 300 comprises a pair of laterally spaced apart castor wheel assemblies 301, 302 pivotally connected to the base frame 100 for swinging about a vertical axis and are located below the frame. Each wheel assembly ( see FIGS. 5, 6, 7) has a relatively thin circular plate 330 (or narrow wheel) mounted thereon to form and force a depression or groove such as a narrow 'V' portion of the ribbon into the ground. It is contemplated that a runner or other means of compression may also be used to aid in forming a depression and adhering the ribbon to the ground. As illustrated in the drawings of the embodiment shown, each wheel assembly has two spaced apart pair of wheels 303, 304 on a common axle or shaft 305. The shaft is attached to the lower end of a vertically disposed strut 306 that slidably passes through a sleeve 307 of a frame structure 308. A set screw 309 through a wall of the sleeve permits locking the wheel unit in different vertical positions as maybe desired. The wheels 303, 304 compact the earth on each of opposite sides of the "V" shaped formation of the web forced into the ground.

The frame 308 has a vertically disposed spindle 310 journal led in a sleeve 311 fixedly secured to a bracket 320 that has a horizontal portion slidably projecting through a sleeve 321. The sleeve 321 has a stem 322 secured thereto and projecting downwardly therefrom through a sleeve 323 which is fixedly secured to the frame side rail( 103, 104) associated therewith. Set screws 325 and 326 provide means for securing the members in various positions as may be desired. As apparent from the drawings the circular plate 330 trails behind the pivotal connection of its frame to the rigid frame structure of the machine.

The frame assembly 308 has the narrow circular plate 330 journal led thereon by an axle or shaft 331 the pivot axis of which is perpendicular to the pivot axis of the spindle 310 and downstream therefrom with reference to the direction of travel of the machine. The wheels 303, 304 rollingly engage the ground downstream from where the plate 330 rollingly engages the ground.

The wheel assembly 301 is mounted on the frame side member 103 in the same manner as discussed above with respect to the caste wheel assembly 302 mounted on the frame side rail 104.

The wheel units 301, 302 can be moved toward and away from one another by sliding the members 320 in their respective sleeves 321. The vertical position of the disc 330 can be adjustably varied by sliding member 322 in the sleeve 323 and the depth of penetration of the disc into the ground can be varied. A depth of 1 to 1.5 inches has been found satisfactory but it can be as much as 3 inches. The deeper the disc drives the ribbon into the ground the tighter the ribbon will be.

The second ground cover anchoring means 400 comprises means on the frame for forcing staples, pins or the like through the in place ribbon and into the ground. In the embodiment illustrated pins 500 are dropped into tubes spaced in a direction laterally across a rear portion of the machine. A ground wheel driven cam raises a driver and allows it to free fall forcing a pin from the tube into the ground. The pins are driven into the ground by the free fall of a hammer weighing about 9 pounds at intervals spacing them as the machine is traveling forward. In the event the ground is hard a tired wheel following the path along which staples of pins are driven can force the anchoring device completely into the ground should they be sticking there above.

Figure 16:
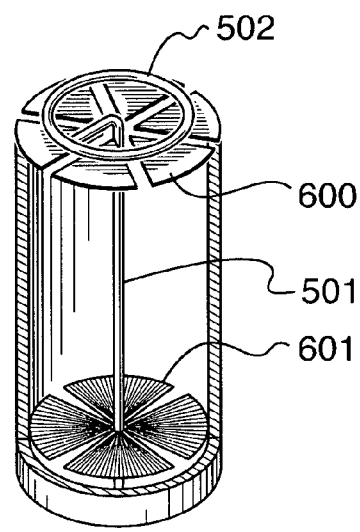
FIG. 16 is a view of a portion of the tube of FIGS. 11 and 12 showing retaining flaps for engaging the head of the spike and coaxial brushes for guiding the shaft of the spike shown in FIG. 13 to aid in positioning of same prior to discharge.

As shown in FIG. 16, means for retaining the spike or pin 500 is disposed within the tube. The retaining shown in the preferred embodiment is a set of flexible members such as triangular flaps 600 which help hold the pin 500 in position prior to engagement with the plunger. Furthermore, a guide means comprising a plurality of radial brush members or fibers extend from the tube inwardly to aid in centering and positioning the shaft of the pin prior to engagement with the plunger.

Referring particularly to FIGS. 2 and 7–12, the ribbon securing means 400 comprises three units designated 401, 404 and 403 mounted on the cross beam 105 and spaced apart from one another in a direction across the width of the machine and inwardly of the marginal edges of the ribbon dispensed and laid on the ground. Each of the units function in the same and therefore only one will be described in detail herein. A drive shaft 405, journal led for rotation on the frame by a plurality of pillow block bearings 402, rotates a cam 406 for each of the respective units. The shaft is driven for rotation by the ground engaging rear wheels 106, 107 by a chain 410 and sprockets 411, 412 secured respectively to the wheel and the shaft 405. A spring loaded chain tension device 413, mounted on the frame 100, has an idler pulley (or sprocket) engaging a free span of the chain. The idler takes up slack in the chain due to wear anchor changing the vertical position of the wheel relative to the frame.

Each cam 406 is a plate secured to the shaft for rotation therewith and is adjustably moveable there along permitting variously positioning the units at different positions laterally across the ribbon deposited on the ground. The plate has an outer cam surface 414 extending a portion of the distance around the circumference of the plate that engages a cam follower consisting of a roller 415 journal led on an elongate driver 416 by a shaft 417. A hammer 418 is pivotally attached to and depends downwardly from the lower end of the driver. The driver weighs about 9 pounds and is located in a vertically disposed elongate tubular member 420. A slot 421 extends downwardly a selected distance length wise of the tubular member. The slot provides a passage for the shaft 417 mounting the cam follower roller 415 on the elongate driver. In the embodiment illustrated the slot extends downwardly from the top end of the tubular member 420 permitting lifting the shaft 417 out of the slot and placing it on the top end of the tube by rotating the driver a partial turn about its longitudinal axis. This allows one to have one or more of the units in or out of operation as maybe desired for the project at hand.

The tubular member 420 has a slot 422 in a lower end portion thereof on the trailing side of the tube with reference to the direction of travel of the machine. This allows the hammer 418 to pivot on it's pivotal connection to the driver with such pivoting being caused by engagement of the hammer head with a spike driven thereby into the ground during forward travel of the machine. An elastic band 423 around the tube and extending across the slot biases the hammer to a position wherein it becomes axially aligned with the driver 416.

The tubular member 420 is mounted on the frame cross member 105 via a first mounting bracket that includes a sleeve 431 through which the tubular member passes, an arm 432 secured to the bracket and which passes through a sleeve 434 of a second mounting bracket. The second mounting bracket has a sleeve 436 fixedly secured to the sleeve 434 and which is slidably mounted on the frame cross member 105. Set screws 440, 441 and 442 provide means of fixedly securing the tubular member 420 in various different positions.

A fastener feed conduit 450 has an upper in-feed end 451 and a lower end that is connected to the tubular member 420 at a position spaced a selected distance upwardly from the lower end of such member.

Figure 13:
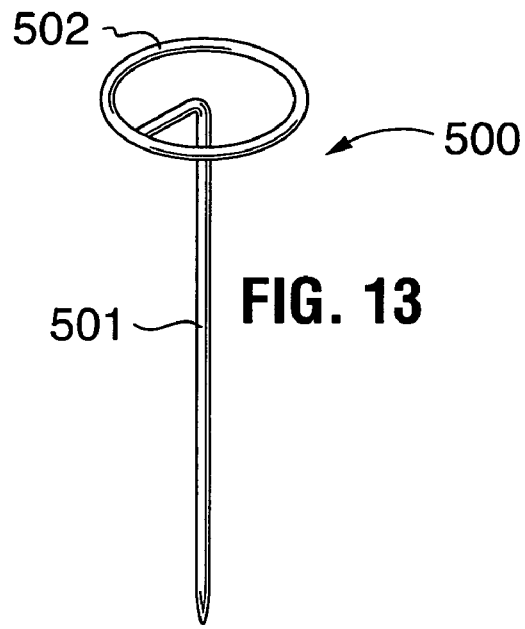
FIG. 13 is a perspective view of a spike driven by the apparatus of 11 and 12 into the ground as a second ground anchoring means.

A single anchor 500 is illustrated in FIG. 13 and consists of a spike 501 having ahead 502. The head is smaller than the internal diameter of the tubular member 420 but larger than a spike arrester or retaining means located in the tubular member and spaced a selected distance from the lower end thereof. The spike arrester or retainer means comprises ball bearings 460 spaced apart from one another circumferentially around the tubular member 420 and projecting thereto. The ball bearings are biased in a direction into the interior of the tubular member by the rubber band 461 or the like.

The cam is driven to rotate in the direction of arrow A during forward movement of the machine. The cam follower engages the cam surface from a point designated 462 to one designated 463 and further onto a point designated 464 during which time the cam follower is moved upwardly from it's lowermost position illustrated in FIG. 12 to it's uppermost position and momentarily retained in that upper position following which the driver is allowed to free fall. The weight of the driver forces a spike retained in the lower portion of the tubular member 420 into the ground.

An operator at one or more of operator stations 471 drops a spike into the in-feed tube from a supply of the same in a container 472 prior to the free fall of the driver. The spike retaining means holds the spike by having the inwardly projecting ball bearings engage the head thereof. The hammer drives the spike head past the retainer forcing the spike into the ground. As previously mentioned the hammer pivots during driving of the spike into the ground due to forward movement of the machine such movement being allowed because of the slot 430 in the lower end of the tubular member 420.

The lower end of the tubular member is closely adjacent the surface of the laid in place ribbon on the ground. To ensure it doesn't engage the laid in place ribbon and cause damage to the same a pair of curved rearwardly facing tines 480, 481 are located one on each of opposite sides of the lower end of the tubular member 420 and at a position slightly lower than the same. The pair of tines are interconnected by a head piece 482 connected to the lower end of an upwardly directed shaft or post 483. The post 483 is telescopically disposed in a tubular member 484 which in turn is slidably mounted on the frame cross member 105. Set screws or the like fix the tubular member at various different positions longitudinally along the cross member 105 as well as fixing the tines at a selected spacing below the lower end of the tubular member 420.

Figure 14:
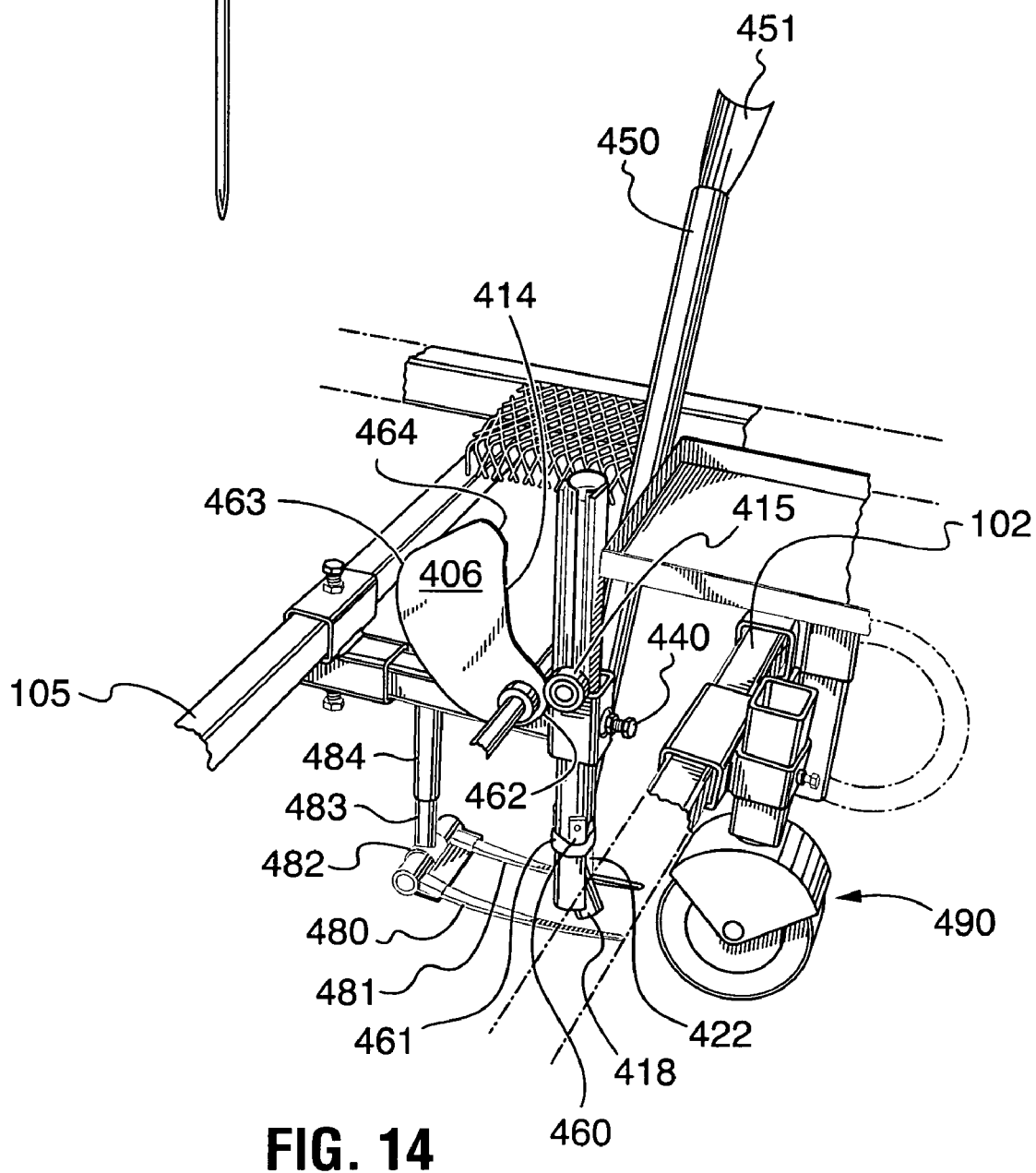
FIG. 14 is the same view as FIG. 12 but including a ground engaging wheel trailing directly behind the spike dispensing tube.

In places where the spike hit hard ground the weight of the free falling driver may not be sufficient to drive the spike in it's entire depth. FIG. 14 there is illustrated a tired wheel 490 mounted on the frame member 102. The wheel is in rolling contact with the ground in alignment with and downstream from the spike dispensing tube 450. Should a spike be sticking up it will be driven into the ground by the wheel.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

We claim:

1. An apparatus for laying a ribbon of ground cover over selected ground areas comprising:
   a rigid frame structure with means supporting same in selected vertical spaced relation above the ground;
   spindle support means on said frame for holding at least one spindle from which a ribbon of suitable ground cover can be dispensed as said apparatus moves forwardly over said selected ground area; and
   means on said apparatus for anchoring said ribbon deposited on the ground while being paved out from said spindle as said apparatus traverses said selected ground area;
   said ground covering anchoring means comprises at least one disc like member mounted on said frame structure and rollingly engageable with the ribbon and positioned to form and press a "V" shape formation of a web at a selected depth into the ground;
   said disc is adjustably mounted on said frame selectively to vary the depth of penetration of the "V" shape formation into the ground;
   including wheels mounted on said frame for rolling engagement with the laid in position ribbon at locations on each of opposite sides and closely adjacent the "V" shaped formation for compacting the earth adjacent thereto;
   said wheels and circular plate are mounted on a common frame; and
   said common frame is pivotally mounted on said rigid frame structure at a location forwardly of where said circular plate engages the ground with reference to the direction of travel of the machine during use thereof.

2. The apparatus for laying a ground cover as defined in claim 1 including a pair of said circular plates disposed in spaced apart relation relative to one another in a direction transverse to the direction of travel of the machine during use of thereof.

3. The apparatus for laying a ground cover as defined in claim 2 wherein said circular plates rollingly engage a laid in place ribbon adjacent the opposite marginal edges thereof.

4. The apparatus for laying a ground cover as defined in claim 3 including wheels mounted on said frame for rolling engagement with the laid in position ribbon at locations on each of opposite sides and closely adjacent the "V" shaped formation adjacent each of the marginal edges of the laid in ribbon for compacting the earth adjacent the respective "V" formations.

5. The apparatus for laying a ground cover as defined in claim 1 including wheels mounted on said frame and rollingly engaging the ground to thereby support at least a portion of said machine.

6. The apparatus for laying a ground cover as defined in claim 5 wherein there are at least two laterally spaced apart wheels supporting a rear portion of said machine.

7. The apparatus for laying a ground cover as defined in claim 6 including means on a front portion of said machine for coupling thereto a three point hitch of a tractor.

8. The apparatus for laying a ground cover as defined in claim 1 wherein said ribbon anchoring means comprises spikes carried by the machine and means mounted on the rigid frame structure thereof for driving said spikes into the ground as the machine traverses the area being covered.

* * * * *